United States Patent
Pan et al.

(10) Patent No.: US 8,104,526 B2
(45) Date of Patent: Jan. 31, 2012

(54) SHEET LAMINATING APPARATUS WITH INSTANT HEAT CONTROL FUNCTION

(75) Inventors: Yung-Tai Pan, Taipei (TW); Yen-Te Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 166 days.

(21) Appl. No.: 12/541,450

(22) Filed: Aug. 14, 2009

(65) Prior Publication Data

US 2010/0294434 A1    Nov. 25, 2010

(30) Foreign Application Priority Data

May 22, 2009    (TW) ................................ 98116988 A

(51) Int. Cl.
*B32B 37/00*    (2006.01)

(52) U.S. Cl. ......... 156/359; 156/499; 156/555; 156/582

(58) Field of Classification Search .................... 156/64, 156/228, 359, 499, 555, 580, 582, 583.1; 700/299, 300
See application file for complete search history.

(56) References Cited

U.S. PATENT DOCUMENTS

| | | | | |
|---|---|---|---|---|
| 5,236,542 | A | * | 8/1993 | Bailey et al. ................ 156/583.1 |
| 6,418,996 | B1 | * | 7/2002 | Hsiao ............................. 156/555 |
| 2009/0032189 | A1 | * | 2/2009 | Jeong ....................... 156/345.24 |

* cited by examiner

*Primary Examiner* — James Sells
(74) *Attorney, Agent, or Firm* — Apex Juris, pllc; Tracy M. Heims

(57) ABSTRACT

A sheet laminating apparatus with an instant heat control function includes a first cylindrical roller, a second cylindrical roller, a first long metal sheet, a first heat-generating case, a second long metal sheet, a second heat-generating case, a contact sensor and a controller. The first long metal sheet and the second long metal sheet are very thin and small, so that the temperature is quickly changed. By using the contact sensor to detect the surface temperature of the first cylindrical roller under control of the controller, the instant heat control function of the sheet laminating apparatus is achieved.

4 Claims, 4 Drawing Sheets

SHEET LAMINATING APPARATUS WITH INSTANT HEAT CONTROL FUNCTION

FIELD OF THE INVENTION

The present invention relates to a sheet laminating apparatus, and more particularly to a sheet laminating apparatus for laminating a sheet article between two pieces of thermoplastic films.

BACKGROUND OF THE INVENTION

Conventionally, a sheet article such as a document or a photo is usually covered with a protective film for protection because such a sheet article is readily suffered from damage. Typically, a sheet laminating apparatus (or a laminator) is used for heating and pressing (or laminating) a sheet article between two pieces of protective films in order to achieve the protective purpose. Hereinafter, the configurations of a conventional sheet laminating apparatus will be illustrated with reference to FIG. 1.

FIG. 1 is a schematic cross-sectional view illustrating a conventional sheet laminating apparatus. As shown in FIG. 1, the sheet laminating apparatus 1 comprises a heat-treating mechanism 10, a transmitting and pressing mechanism 11 and a transfer passage 12. The heat-treating mechanism 10 includes a heater 101 and an electrically-heated plate 102. The external surface of the transmitting and pressing mechanism 11 is enclosed by the heater 101. In addition, the heater 101 is separated from the transmitting and pressing mechanism 11 by a gap.

The process for laminating a sheet article (not shown) by using the sheet laminating apparatus 1 will be described as follows. First of all, the sheet article is sandwiched between an upper thermoplastic film and a lower thermoplastic film to form a sandwich structure. Then, the sandwich structure is fed into the transfer passage 12 through an entrance 121. By means of the transmitting and pressing mechanism 11, the sandwich structure is continuously transported through the passage 12. During this stage, the electrically-heated plate 102 of the heat-treating mechanism 10 transforms electricity to heat energy so as to preheat the sandwich structure. The heat energy generated by the electrically-heated plate 102 is uniformly distributed over the heater 101, and radiated through an air gap between the heater 101 and the transmitting and pressing mechanism 11 so as to heat up the transmitting and pressing mechanism 10. The transmitting and pressing mechanism 11 presses against opposite sides of the sandwich structure that is transported through the transfer passage 12, and transmits the heat energy to the sandwich structure so as to soften the thermoplastic films. After being transmitted and pressed by the transmitting and pressing mechanism 11, the sheet article bonds with the softened thermoplastic films to form a laminate structure. Meanwhile, the sheet article is fixed between these two pieces of thermoplastic films.

For enhancing the laminating efficacy, the sheet laminating apparatus 1 should to be adjusted at a proper hot press temperature according to the thickness of the sheet article to be laminated. Since the heater 101 is relatively thick, it is time-consuming to uniformly distribute the heat over the heater 101. Under this circumstance, the transmitting and pressing mechanism 11 is slowly heated up. Since it takes a waiting time to heat up the transmitting and pressing mechanism 11, the conventional sheet laminating apparatus 1 is not user-friendly. For solving the above drawbacks, Taiwanese Patent No. 484589 has disclosed a method for increasing the speed of heating up the transmitting and pressing mechanism by reducing the thickness of the heater 101.

FIG. 2 is a schematic cross-sectional view illustrating another conventional sheet laminating apparatus disclosed in Taiwanese Patent No. 484589. As shown in FIG. 2, the sheet laminating apparatus 2 comprises two rollers 21 (i.e. the transmitting and pressing mechanism), a heat-conducting case 22 (i.e. the heater) and a heat generator 23. The rollers 21 are enclosed by the heat-conducting case 22. The heat generator 23 is mounted in the heat-conducting case 22 for transferring heat to the heat-conducting case 22. Since the heat-conducting case 22 is thin and flat, the rollers 21 enclosed by the heat-conducting case 22 are quickly heated up to the working temperature.

The sheet laminating apparatus, however, still has some drawbacks. For example, due to the thin heat-conducting case 22, the heat is dissipated away fast and the heat loss is considerable. Under this circumstance, the working temperatures of the rollers 21 become unstable and thus the laminating efficacy is unsatisfied. Moreover, since large portions of the rollers 21 are enclosed by the heat-conducting case 22, the overall volume of the heat-conducting case 22 is still huge. In other words, the sheet laminating apparatus 2 is not cost-effective.

SUMMARY OF THE INVENTION

The present invention relates to a sheet laminating apparatus, and more particularly to a sheet laminating apparatus with an instant heat control function in order to enhance the laminating efficacy.

In accordance with an aspect of the present invention, there is provided a sheet laminating apparatus with an instant heat control function to laminate a sheet article between two thermoplastic films. The sheet laminating apparatus includes a first cylindrical roller, a second cylindrical roller, a first long metal sheet, a first heat-generating case, a second long metal sheet, a second heat-generating case, a contact sensor and a controller. The first cylindrical roller has a first roller surface. The second cylindrical roller has a second roller surface. The first roller surface is contacted with the second roller surface. The first cylindrical roller and the second cylindrical roller are rotated in opposite directions for pressing the sheet article and the thermoplastic films that are transported between the first cylindrical roller and the second cylindrical roller. The first long metal sheet is arranged beside the first cylindrical roller and separated from the first cylindrical roller by a first gap, thereby transferring heat to the first cylindrical roller. The first heat-generating case is contacted with the first long metal sheet for generating heat to the first long metal sheet. The second long metal sheet is arranged beside the second cylindrical roller and separated from the second cylindrical roller by a second gap, thereby transferring heat to the second cylindrical roller. The second heat-generating case is contacted with the second long metal sheet for generating heat to the second long metal sheet. The contact sensor is contacted with the first roller surface of the first cylindrical roller for detecting a temperature of the first roller surface. The controller is connected to the contact sensor, the first heat-generating case and the second heat-generating case for controlling temperatures of the first roller surface and the second roller surface.

In an embodiment, the sheet laminating apparatus further includes an elastomeric element. The contact sensor is disposed on the elastomeric element. The elastomeric element is sustained against the contact sensor such that the contact sensor is contacted with the first roller surface.

In an embodiment, the sheet laminating apparatus further includes a supporting element for supporting the elastomeric element.

In an embodiment, the elastomeric element is made of low thermally-conductive material.

In an embodiment, the first long metal sheet is enclosed by the first heat-generating case, and the second long metal sheet is enclosed by the second heat-generating case.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
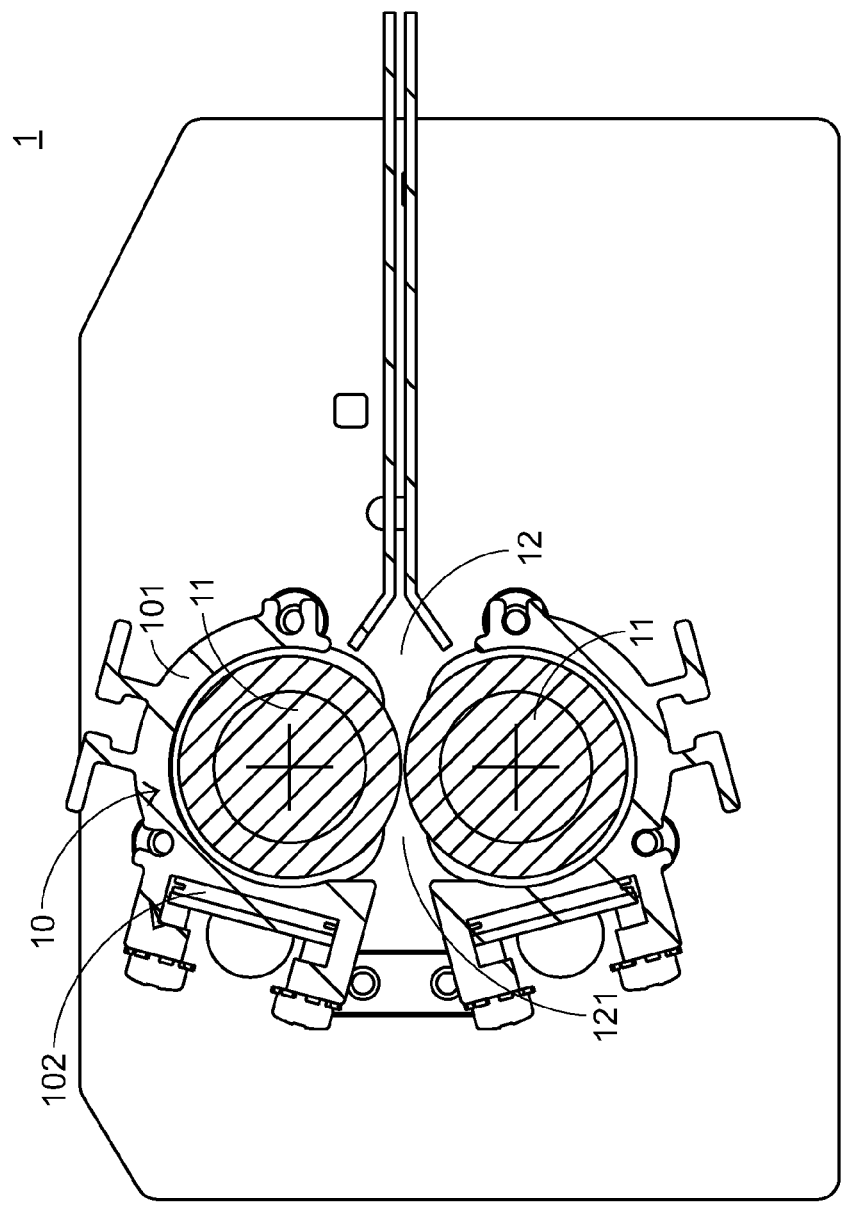
FIG. 1 is a schematic cross-sectional view illustrating a conventional sheet laminating apparatus.
Figure 2:
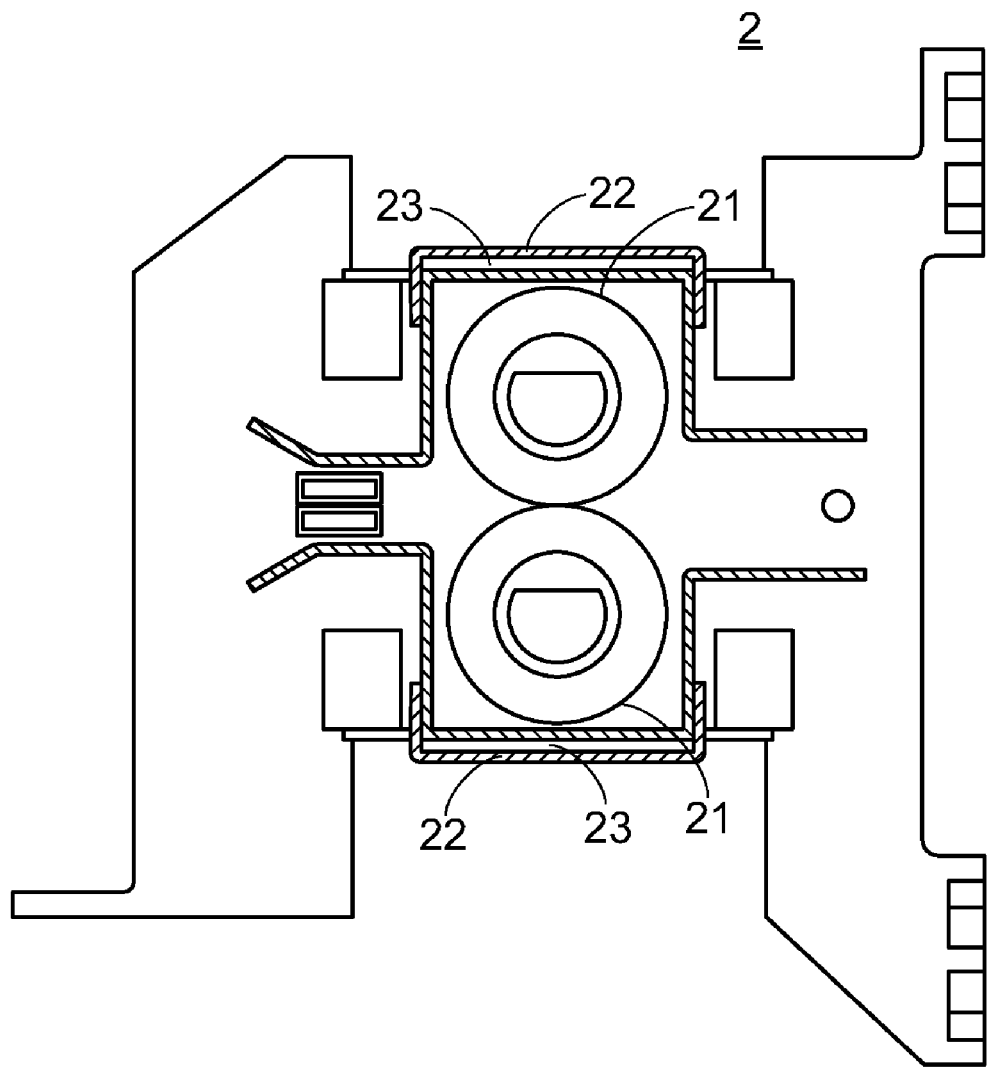
FIG. 2 is a schematic cross-sectional view illustrating another conventional sheet laminating apparatus disclosed in Taiwanese Patent No. 484589.
Figure 3:
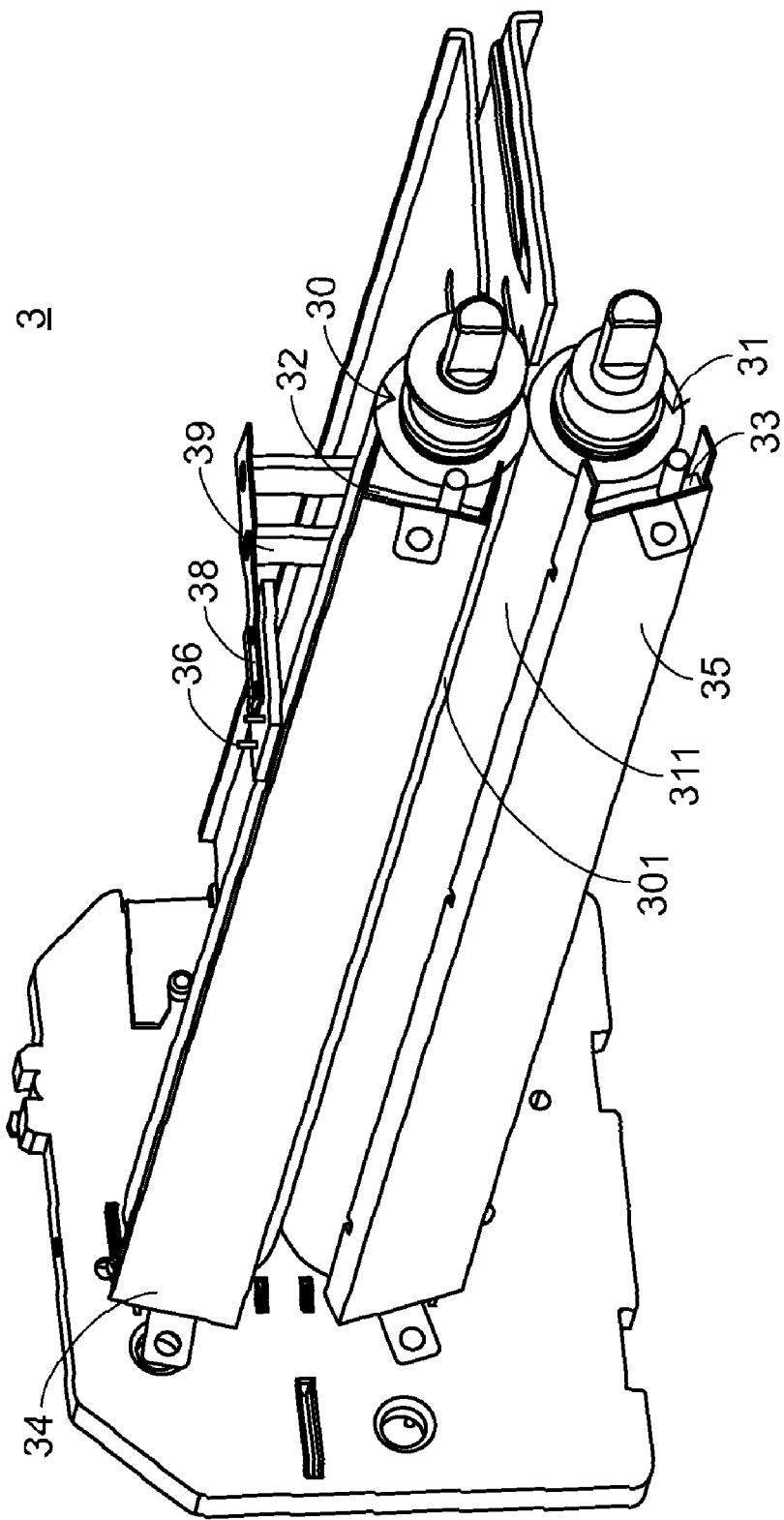
FIG. 3 is a schematic perspective view illustrating the outward appearance of a sheet laminating apparatus according to an embodiment of the present invention.
Figure 4:
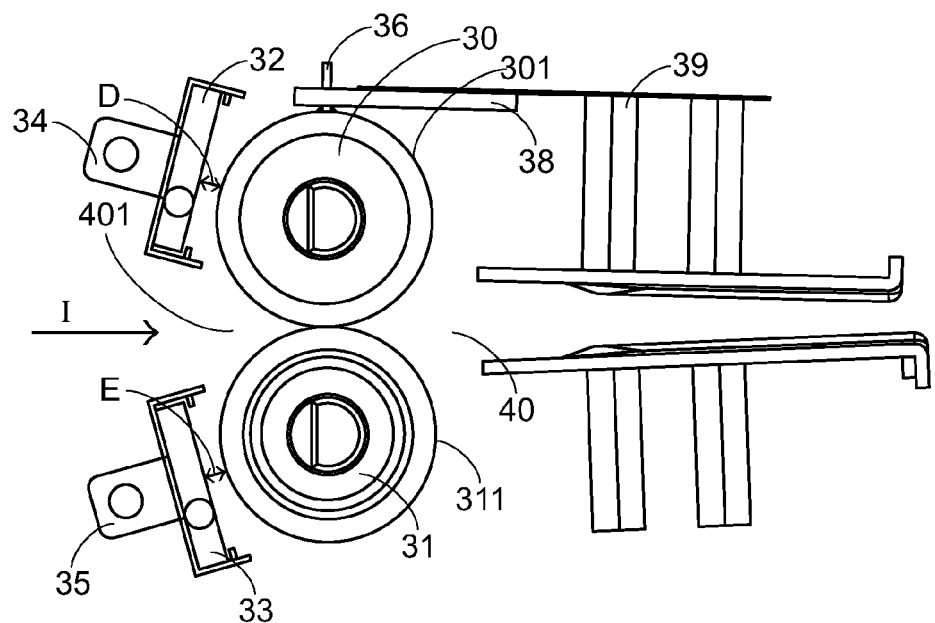
FIG. 4 is a schematic top view illustrating the sheet laminating apparatus as shown in FIG. 3.

FIG. 3 is a schematic perspective view illustrating the outward appearance of a sheet laminating apparatus according to an embodiment of the present invention. FIG. 4 is a schematic top view illustrating the sheet laminating apparatus as shown in FIG. 3. As shown in FIGS. 3 and 4, the sheet laminating apparatus comprises a first cylindrical roller 30, a second cylindrical roller 31, a first long metal sheet 32, a second long metal sheet 33, a first heat-generating case 34, a second heat-generating case 35, a contact sensor 36 and a controller 37. The first cylindrical roller 30 has a first roller surface 301. The second cylindrical roller 31 has a second roller surface 311.

The first roller surface 301 is contacted with second roller surface 311. The first long metal sheet 32 is enclosed by the first heat-generating case 34. The first long metal sheet 32 is arranged beside the first cylindrical roller 30 and separated from the first roller surface 301 by a first gap D. The second long metal sheet 33 is enclosed by the second heat-generating case 35. The second long metal sheet 33 is arranged beside the second cylindrical roller 31 and separated from the second roller surface 311 by a second gap E.

The working temperature of the sheet laminating apparatus 3 is adjusted according to the thickness of the sheet article to be laminated by the sheet laminating apparatus 3. The first heat-generating case 34 and the second heat-generating case 35 could transform electricity to heat energy. The heat energy generated by the first heat-generating case 34 and the second heat-generating case 35 will be transmitted to the first long metal sheet 32 and the second long metal sheet 33, respectively. Next, the heat energy is radiated to the first cylindrical roller 30 and the second cylindrical roller 31 through air. As such, the first roller surface 301 of the first cylindrical roller 30 and the second roller surface 311 of the second cylindrical roller 31 are heated up. Until the working temperatures of the first roller surface 301 and the second roller surface 311 are reached, a sheet article sandwiched between an upper thermoplastic film and a lower thermoplastic film to form a sandwich structure (not shown) and the sandwich structure is fed into the sheet laminating apparatus 3 through an entrance 401 of a transfer passage 40 in the direction 1. The first cylindrical roller 30 and the second cylindrical roller 31 are rotated in opposite directions, so that the sandwich structure is transported through the transfer passage 40 and pressed by the first cylindrical roller 30 and the second cylindrical roller 31.

As mentioned above, the first long metal sheet 32 and the second long metal sheet 33 are only arranged beside the first cylindrical roller 30 and the second cylindrical roller 31, respectively. In other words, since the first roller surface 301 and the second roller surface 311 are not widely enclosed by the first long metal sheet 32 and the second long metal sheet 33, the dimensions of the first long metal sheet 32 and the second long metal sheet 33 are largely reduced and the sheet laminating apparatus 3 becomes more cost-effective. For maintaining the stable working temperature of the sheet laminating apparatus 3, the present invention provides a feedback control strategy to control the working temperature of the sheet laminating apparatus 3.

Figure 5:
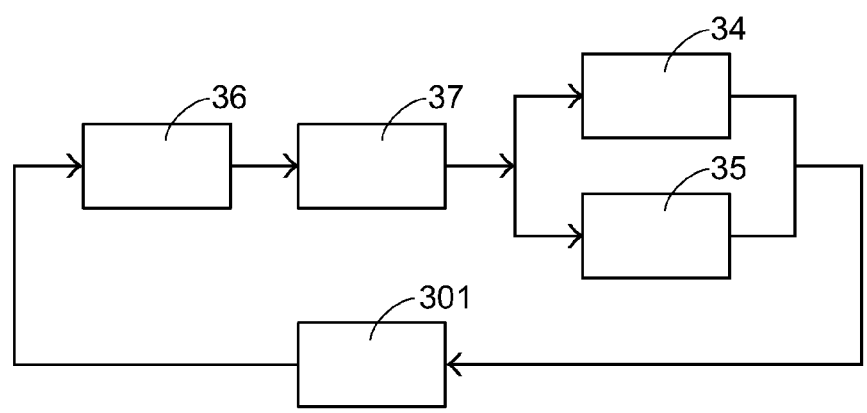
FIG. 5 is a schematic functional block diagram illustrating a temperature control system according to an embodiment of the present invention.

Hereinafter, a temperature control system of the present invention will be illustrated in more details with reference to FIG. 5. FIG. 5 is a schematic functional block diagram illustrating a temperature control system according to an embodiment of the present invention. In accordance with a key feature of the present invention, the contact sensor 36 is contacted with the first roller surface 301 for detecting the temperature of the first roller surface 301. The information associated with the temperature of the first roller surface 301 is then transmitted to the controller 37, which is connected with the contact sensor 36, the first heat-generating case 34 and the second heat-generating case 35.

Next, the temperature information is compared with a predetermined working temperature by the controller 37. If the temperature information is lower than the predetermined working temperature, compensating electrical energy is transmitted to the first heat-generating case 34 and the second heat-generating case 35 under control of the controller 37. The compensating electrical energy is transformed into heat by the first heat-generating case 34 and the second heat-generating case 35, so that the temperatures on the first roller surface 301 and the second roller surface 311 quickly rise to the predetermined working temperatures. Whereas, if the temperature information is higher than the predetermined working temperature, the electrical energy will not be transmitted to the first heat-generating case 34 and the second heat-generating case 35 under control of the controller 37. As a consequence, the temperatures on the first roller surface 301 and the second roller surface 311 quickly decrease to the predetermined working temperatures.

Please refer to FIGS. 3 and 4 again. The sheet laminating apparatus 3 further comprises an elastomeric element 38 and a supporting element 39. The elastomeric element 38 is supported by the supporting element 39. The contact sensor 36 is disposed on the elastomeric element 38. Since the elastomeric element 38 is sustained against the contact sensor 36, the contact sensor 36 is contacted with the first roller surface 301. By means of the elastomeric element 38, the contact sensor 36 will be continuously contacted with the first roller surface 301 even if the supporting element 39 is aged or deformed after a long use period. Moreover, the elastomeric element 38 is made of low thermally-conductive material in order to reduce the heat loss.

From the above description, since the first long metal sheet 32 and the second long metal sheet 33 of the sheet laminating apparatus 3 are very thin and small, the fabricating cost of the sheet laminating apparatus 3 and the temperatures on the first roller surface 301 and the second roller surface 311 will quickly rise or decrease. Under the compensating control of the controller 37, the instant heat control function of the sheet laminating apparatus 3 is achieved and thus the sheet laminating apparatus 3 is operated at a stable working temperature. Under this circumstance, the laminating efficacy is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet laminating apparatus with an instant heat control function to laminate a sheet article between two pieces of thermoplastic films, said sheet laminating apparatus comprising:

a first cylindrical roller having a first roller surface;

a second cylindrical roller having a second roller surface, wherein said first roller surface is contacted with said second roller surface, and said first cylindrical roller and said second cylindrical roller are rotated in opposite directions for pressing said sheet article and said thermoplastic films that are transported between said first cylindrical roller and said second cylindrical roller;

a first long metal sheet arranged beside said first cylindrical roller and separated from said first cylindrical roller by a first gap, thereby transferring heat to said first cylindrical roller;

a first heat-generating case contacted with said first long metal sheet for generating heat to said first long metal sheet;

a second long metal sheet arranged beside said second cylindrical roller and separated from said second cylindrical roller by a second gap, thereby transferring heat to said second cylindrical roller;

a second heat-generating case contacted with said second long metal sheet for generating heat to said second long metal sheet wherein said first long metal sheet is enclosed by said first heat-generating case, and said second long metal sheet is enclosed by said second a contact sensor contacted with said first roller surface of said first cylindrical roller for detecting a temperature of said first roller surface; and a controller connected to said contact sensor, said first heat-generating case and said second heat-generating case for controlling temperatures of said first roller surface and said second roller surface.

2. The sheet laminating apparatus with an instant heat control function according to claim 1 wherein said sheet laminating apparatus further includes an elastomeric element, said contact sensor is disposed on said elastomeric element, and said elastomeric element is sustained against said contact sensor such that said contact sensor is contacted with said first roller surface.

3. The sheet laminating apparatus with an instant heat control function according to claim 2 wherein said sheet laminating apparatus further includes a supporting element for supporting said elastomeric element.

4. The sheet laminating apparatus with an instant heat control function according to claim 3 wherein said elastomeric element is made of low thermally-conductive material.

* * * * *

UNITED STATES PATENT AND TRADEMARK OFFICE
CERTIFICATE OF CORRECTION

PATENT NO. : 8,104,526 B2
APPLICATION NO. : 12/541450
DATED : January 31, 2012
INVENTOR(S) : Yung-Tai Pan et al.

It is certified that error appears in the above-identified patent and that said Letters Patent is hereby corrected as shown below:

Col. 6, Line 12, Claim 1, third paragraph from the end should read: "a second heat-generating case contacted with said second long metal sheet for generating heat to said second long metal sheet wherein said first long metal sheet is enclosed by said first heat-generating case, and said second long metal sheet is enclosed by said second heat-generating case;"

Claim 1: A sheet laminating apparatus with an instant heat control function to laminate a sheet article between two pieces of thermoplastic films, said sheet laminating apparatus comprising:
    a first cylindrical roller having a first roller surface;
    a second cylindrical roller having a second roller surface, wherein said first roller surface is contacted with said second roller surface, and said first cylindrical roller and said second cylindrical roller are rotated in opposite directions for pressing said sheet article and said thermoplastic films that are transported between said first cylindrical roller and said second cylindrical roller;
    a first long metal sheet arranged beside said first cylindrical roller and separated from said first cylindrical roller by a first gap, thereby transferring heat to said first cylindrical roller;
a first heat-generating case contacted with said first long metal sheet for generating heat to said first long metal sheet;
    a second long metal sheet arranged beside said second cylindrical roller and separated from said second cylindrical roller by a second gap, thereby transferring heat to said second cylindrical roller;
    a second heat-generating case contacted with said second long metal sheet for generating heat to said second long metal sheet wherein said first long metal sheet is enclosed by said first heat-generating case, and said second long metal sheet is enclosed by said second heat-generating case;
    a contact sensor contacted with said first roller surface of said first cylindrical roller for detecting a temperature of said first roller surface; and
    a controller connected to said contact sensor, said first heat-generating case and said second heat-generating case for controlling temperatures of said first roller surface and said second roller surface.

Signed and Sealed this
Twenty-seventh Day of March, 2012

David J. Kappos
*Director of the United States Patent and Trademark Office*